United States Patent
Chiu et al.

(10) Patent No.: US 8,195,048 B2
(45) Date of Patent: Jun. 5, 2012

(54) OPTICAL TRANSPORT SYSTEM ARCHITECTURE FOR REMOTE TERMINAL CONNECTIVITY

(75) Inventors: Angela Chiu, Holmdel, NJ (US); Michael Herbert Eiselt, Middletown, NJ (US); Jay Martin Wiesenfeld, Lincroft, NJ (US); Lara Denise Garrett, Red Bank, NJ (US); Mark Shtaif, Even Yehuda, IL (US)

(73) Assignee: Pivotal Decisions LLC, Las Vegas, NV (US)

( * ) Notice: Subject to any disclaimer, the term of this patent is extended or adjusted under 35 U.S.C. 154(b) by 0 days.

(21) Appl. No.: 12/540,913

(22) Filed: Aug. 13, 2009

(65) Prior Publication Data

US 2010/0021159 A1 Jan. 28, 2010

Related U.S. Application Data

(63) Continuation of application No. 10/427,896, filed on Apr. 30, 2003, now Pat. No. 7,593,637.

(60) Provisional application No. 60/377,085, filed on Apr. 30, 2002.

(51) Int. Cl.
*H04J 14/02* (2006.01)

(52) U.S. Cl. .................. 398/82; 398/48; 398/83

(58) Field of Classification Search ............ 398/66–73, 398/181–198, 202–214, 45–49, 82–83
See application file for complete search history.

(56) References Cited

U.S. PATENT DOCUMENTS

| | | | |
|---|---|---|---|
| 4,229,831 A | 10/1980 | Lacher | |
| 4,535,459 A | 8/1985 | Hogge, Jr. | |
| 4,636,859 A | 1/1987 | Vernhet et al. | |
| 4,710,022 A | 12/1987 | Soeda et al. | |
| 5,224,183 A | 6/1993 | Dugan | |
| 5,225,922 A | 7/1993 | Chraplyvy et al. | |
| 5,267,071 A | 11/1993 | Little et al. | |
| 5,299,048 A | 3/1994 | Suyama | |
| 5,321,541 A | 6/1994 | Cohen | |
| 5,351,146 A | 9/1994 | Chan et al. | |
| 5,455,703 A | 10/1995 | Duncan et al. | |
| 5,559,625 A | 9/1996 | Smith et al. | |
| 5,588,003 A | 12/1996 | Ohba et al. | |
| 5,613,210 A | 3/1997 | Van Driel et al. | |
| 5,726,784 A | 3/1998 | Alexander et al. | |
| 5,737,118 A | 4/1998 | Sugaya et al. | |
| 5,778,116 A | 7/1998 | Tomich | |
| 5,790,285 A | 8/1998 | Mock | |

(Continued)

FOREIGN PATENT DOCUMENTS

JP 01115230 5/1989

(Continued)

OTHER PUBLICATIONS

Alexander et al., "A Precompetitive Consortium on Wide-Band All-Optical Networks", Journal of Lightwave Technology, 11(5/6), May/Jun. 1993, 714-735.

(Continued)

*Primary Examiner* — Dzung Tran

(74) *Attorney, Agent, or Firm* — Woodcock Washburn LLP

(57) ABSTRACT

The invention pertains to optical fiber transmission systems, and is particularly relevant to transmission of high volume of data and voice traffic among different locations. In particular, the improvement teaches the use of a single optical transport system for both metropolitan area transport and long haul transport of data and voice traffic.

26 Claims, 5 Drawing Sheets

U.S. PATENT DOCUMENTS

| | | | |
|---|---|---|---|
| 5,812,290 | A | 9/1998 | Maeno et al. |
| 5,877,881 | A | 3/1999 | Miyauchi et al. |
| 5,903,613 | A | 5/1999 | Ishida |
| 5,914,794 | A | 6/1999 | Fee |
| 5,914,799 | A | 6/1999 | Tan |
| 5,936,753 | A | 8/1999 | Ishikaawa |
| 5,940,209 | A | 8/1999 | Nguyen |
| 5,963,350 | A | 10/1999 | Hill |
| 5,995,694 | A | 11/1999 | Akasaka et al. |
| 6,005,702 | A | 12/1999 | Suzuki et al. |
| 6,021,245 | A | 2/2000 | Berger et al. |
| 6,038,062 | A | 3/2000 | Kosaka |
| 6,075,634 | A | 6/2000 | Casper et al. |
| 6,078,414 | A | 6/2000 | Iwano |
| 6,081,360 | A | 6/2000 | Ishikawa et al. |
| 6,084,694 | A | 7/2000 | Milton et al. |
| 6,088,152 | A | 7/2000 | Berger et al. |
| 6,108,074 | A | 8/2000 | Bloom |
| 6,122,095 | A | 9/2000 | Fatehi |
| 6,151,334 | A | 11/2000 | Kim et al. |
| 6,157,477 | A | 12/2000 | Robinson |
| 6,160,614 | A | 12/2000 | Unno |
| 6,163,392 | A | 12/2000 | Condict et al. |
| 6,163,636 | A | 12/2000 | Stentz et al. |
| 6,173,094 | B1 | 1/2001 | Bowerman et al. |
| 6,177,985 | B1 | 1/2001 | Bloom |
| 6,198,559 | B1 | 3/2001 | Gehlot |
| 6,229,599 | B1 | 5/2001 | Galtarossa |
| 6,236,481 | B1 | 5/2001 | Laor |
| 6,236,499 | B1 | 5/2001 | Berg et al. |
| 6,246,510 | B1 | 6/2001 | BuAbbud et al. |
| 6,259,553 | B1 | 7/2001 | Kinoshita |
| 6,259,554 | B1 | 7/2001 | Shigematsu et al. |
| 6,259,693 | B1 | 7/2001 | Ganmukhi et al. |
| 6,259,845 | B1 | 7/2001 | Sardesai |
| 6,272,185 | B1 | 8/2001 | Brown |
| 6,275,315 | B1 | 8/2001 | Park et al. |
| 6,288,811 | B1 | 9/2001 | Jiang et al. |
| 6,288,813 | B1 | 9/2001 | Kirkpatrick et al. |
| 6,307,656 | B2 | 10/2001 | Terahara |
| 6,317,231 | B1 | 11/2001 | Al-Salameh et al. |
| 6,317,255 | B1 | 11/2001 | Fatehi et al. |
| 6,323,950 | B1 | 11/2001 | Kim et al. |
| 6,327,060 | B1 | 12/2001 | Otani et al. |
| 6,356,384 | B1 | 3/2002 | Islam |
| 6,359,729 | B1 | 3/2002 | Amoruso |
| 6,385,366 | B1 | 5/2002 | Lin |
| 6,388,801 | B1 | 5/2002 | Sugaya et al. |
| 6,396,853 | B1 | 5/2002 | Humphrey et al. |
| 6,438,286 | B1 | 8/2002 | Duerksen |
| 6,480,326 | B2 | 11/2002 | Papernyl et al. |
| 6,515,779 | B2 | 2/2003 | Fee |
| 6,519,060 | B1 | 2/2003 | Lui |
| 6,519,082 | B2 | 2/2003 | Ghera et al. |
| 6,574,037 | B2 | 6/2003 | Islam et al. |
| 6,583,901 | B1 | 6/2003 | Hung |
| 6,608,709 | B2 | 8/2003 | Duerksen |
| 6,609,840 | B2 | 8/2003 | Chow et al. |
| 6,621,835 | B1 | 9/2003 | Fidric |
| 6,708,004 | B1 * | 3/2004 | Homsey ............... 398/177 |
| 6,744,958 | B2 | 6/2004 | Inagaki et al. |
| 6,744,988 | B2 | 6/2004 | Leclerc et al. |
| 6,807,232 | B2 | 10/2004 | Nicholson et al. |
| 6,820,230 | B2 * | 11/2004 | Sweeney ............... 714/776 |
| 6,826,201 | B2 | 11/2004 | Hind |
| 6,944,163 | B2 | 9/2005 | Bottorff et al. |
| 6,950,448 | B2 | 9/2005 | Tornetta et al. |
| 7,027,732 | B2 * | 4/2006 | Paiam et al. ............ 398/50 |
| 7,046,695 | B2 | 5/2006 | Silvers |
| 7,139,277 | B2 | 11/2006 | Ofek et al. |
| 7,170,906 | B2 | 1/2007 | Ofek et al. |
| 7,200,333 | B2 | 4/2007 | Katagiri et al. |
| 7,231,148 | B2 | 6/2007 | Kinoshita et al. |
| 7,233,742 | B2 | 6/2007 | Hoshida et al. |
| 7,254,333 | B2 | 8/2007 | Shimizu |
| 7,295,782 | B2 | 11/2007 | Gentner et al. |
| 7,564,866 | B2 | 7/2009 | Agazzi et al. |
| 2002/0039213 | A1 | 4/2002 | Duerksen |
| 2002/0080443 | A1 * | 6/2002 | Stern ..................... 359/124 |
| 2002/0126700 | A1 * | 9/2002 | Rokugo ................. 370/469 |
| 2002/0126789 | A1 * | 9/2002 | Georges et al. ......... 375/377 |
| 2002/0141692 | A1 * | 10/2002 | Hung ..................... 385/24 |
| 2002/0145776 | A1 * | 10/2002 | Chow et al. ............ 359/124 |
| 2004/0001715 | A1 * | 1/2004 | Katagiri et al. ......... 398/81 |

FOREIGN PATENT DOCUMENTS

JP  02238736  9/1990

OTHER PUBLICATIONS

El-Bawab et al., "Internetworking of Multiwavelenght Local Optical Networks Based on a Wavelength-Tolerant Receiver Technology", Photonic Network Communications, Jan. 2001, 3(3), 285-296.

Gerstel et al., "Optical Layer Survivability—An Implementation Perspective", IEEE Journal on Selected Areas in Communications, Oct. 2000, 18(10), 1885-1899.

Green et al., "Optical Network Update", IEEE Journal on Selected Areas in Communications, Jun. 1996, 14(5), 764-779.

Saleh et al., "Architectural Principles of Optical Regional and Metropolitan Access Networks", Journal of Lightwave Technology, Dec. 1999, 17(12), 2431-2448.

Stoll et al., Metropolitan DWDM: A Dynamically Configurable Ring for the KomNet Field Trial in Berlin, IEEE Communications Magazine, Feb. 2001, 106-113.

Tomkos et al., "Transport Performance of an 80-Gb/s WDM Regional Area Transparent Ring Network Utilizing Directly Modulated Lasers", Journal of Lightwave Technology, Apr. 2002, 20(4), 562-573.

* cited by examiner

OPTICAL TRANSPORT SYSTEM ARCHITECTURE FOR REMOTE TERMINAL CONNECTIVITY

CROSS-REFERENCE TO RELATED APPLICATIONS

This application is a Continuation of application Ser. No. 10/427,896, entitled "OPTICAL TRANSPORT SYSTEM ARCHITECTURE FOR REMOTE TERMINAL CONNECTIVITY", filed Apr. 30, 2003, which claims the benefit of U.S. Provisional Patent Application Ser. No. 60/377,085, entitled "OPTICAL TRANSPORT SYSTEM UTILIZING REMOTE TERMINAL CONNECTIVITY", filed Apr. 30, 2002. Each of which is herein incorporated by reference in its entirety.

TECHNICAL FIELD

The present invention relates, in general, to the field of optical communications, and in particular to, an optical transport system that uses distributed terminals. Characteristics of a distributed terminal architecture are described in co-pending U.S. patent application Ser. No. 10/402,840 entitled "Distributed Terminal Optical Transmission System" incorporated herein by reference. More specifically, this invention teaches the architecture to provide connectivity between remote terminals.

BACKGROUND

A goal of many modern long-haul optical transport systems is to provide for the efficient transmission of large volumes of voice traffic and data traffic over trans-continental distances at low costs. Various methods of achieving these goals include time-division multiplexing (TDM) and wavelength-division multiplexing (WDM). In time division multiplexed systems, data streams comprised of short pulses of light are interleaved in the time domain to achieve high spectral efficiency, high data rate transport. In wavelength division multiplexed systems, data streams comprised of short pulses of light of different carrier frequencies, or equivalently wavelength, co-propagate in the same fiber to achieve high spectral efficiency, high data rate transport.

The transmission medium of these systems is typically optical fiber. In addition there is a transmitter and a receiver. The transmitter typically includes a semiconductor diode laser, and supporting electronics. The laser is often a DFB laser stabilized to a specified frequency on the ITU frequency grid. The laser may be directly modulated with a data train with an advantage of low cost, and a disadvantage of low reach and capacity performance. In many long-haul systems, the laser is externally modulated using a modulator. A single stage modulator is sufficient for a non-return-zero (NRZ) modulation format. A two-stage modulator is typically used with the higher performance return-to-zero (RZ) modulation format. An example of a modulator technology is the Mach-Zehnder lithium niobate modulator. Alternatively, an electro-absorptive modulator may be used. After binary modulation, a high bit may be transmitted as an optical signal level with more power than the optical signal level in a low bit. Often, the optical signal level in a low bit is engineered to be equal to, or approximately equal to zero. In addition to binary modulation, the data can be transmitted with multiple levels, although in current optical transport systems, a two-level binary modulation scheme is predominantly employed. The receiver is located at the opposite end of the optical fiber, from the transmitter. The receiver is typically comprised of a semiconductor photodetector and accompanying electronics.

Typical long-haul optical transport dense wavelength division multiplexed (DWDM) systems transmit 40 to 80 channels at 10 Gbps (gigabit per second) across distances of 3000 to 6000 km in a single 35-nm spectral band. In a duplex system, traffic is both transmitted and received between parties at opposite end of the link. In a DWDM system, different channels operating at distinct carrier frequencies are multiplexed using a multiplexer. Such multiplexers may be implemented using arrayed waveguide grating (AWG) technology or thin-film technology, or a variety of other technologies. After multiplexing, the optical signals are coupled into the transport fiber for transmission to the receiving end of the link. The total link distance may, in today's optical transport systems, be two different cities separated by continental distances, from 1000 km to 6000 km, for example. To successfully bridge these distances with sufficient optical signal power relative to noise, the signal is periodically amplified using an in-line optical amplifier. Typical span distances between optical amplifiers are 50-100 km. Thus, for example, 30 100-km spans would be used to transmit optical signals between points 3000 km apart. Examples of in-line optical amplifiers include erbium doped fiber amplifiers (EDFAs) and semiconductor optical amplifiers (SOAs).

At the receiving end of the link, the optical channels are demultiplexed using a demultiplexer. Such demultiplexers may be implemented using AWG technology or thin-film technology, or a variety of other technologies. Each channel is then optically coupled to separate optical receivers.

Other common variations include the presence of post-amplifiers and pre-amplifiers just before and after the multiplexer and de-multiplexer. Often, there is also included dispersion compensation with the in-line amplifiers. These dispersion compensators adjust the phase information of the optical pulses in order to compensate for the chromatic dispersion in the optical fiber while appreciating the role of optical nonlinearities in the optical fiber. Another variation that may be employed is the optical dropping and adding of channels at cities located in between the two end cities. The invention disclosed applies in any of these variations, as well as others.

Traditionally, optical transport systems are either long haul systems, for traffic between distant cities, or metropolitan ("metro") systems for traffic in and around a city. Typically the terminals of a long-haul optical transport system are located in one location such as a central office, and all the channels in a DWDM system are terminated. The traffic is then sorted by electronic identification of data and routed to different parts of the metropolitan area using metropolitan optical transport systems. In many practical circumstances, there is a space, power and cost inefficiency in terminating the long haul signal and retransmitting over a second metro-system. For this reason, the concept of a distributed terminal architecture was invented, and is disclosed in co-pending U.S. patent application Ser. No. 10/402,840, hereafter referred to as Jaggi.

As taught by Jaggi, there was no provision for duplex traffic between distributed terminals in the same metropolitan area. It would be highly desirable for a terminal in one section of a city to exchange traffic with a second terminal in a second section of the city while also providing scalable communication with cities a great distance away.

SUMMARY

In the present invention, improvements to an optical transport system with a distributed terminal architecture are disclosed. More specifically, this invention teaches the architecture to provide scalable duplex connectivity between multiple terminals and remote terminals.

In one embodiment of the invention, an overlay for connections in a distributed terminal architecture is taught.

In another embodiment of the invention, an architecture to provide scalable duplex connectivity between multiple terminals at a terminal city overlay is taught.

In another embodiment of the invention, an architecture to provide scalable duplex connectivity between terminals at optical-add-drop multiplexed (OADM) sites is taught.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF ILLUSTRATIVE EMBODIMENTS

While the making and using of various embodiments of the present invention are discussed in detail below, it should be appreciated that the present invention provides many applicable inventive concepts which can be embodied in a wide variety of specific contexts. The specific embodiments described herein are merely illustrative of specific ways to make and use the invention and do not delimit the scope of the invention.

Figure 1:
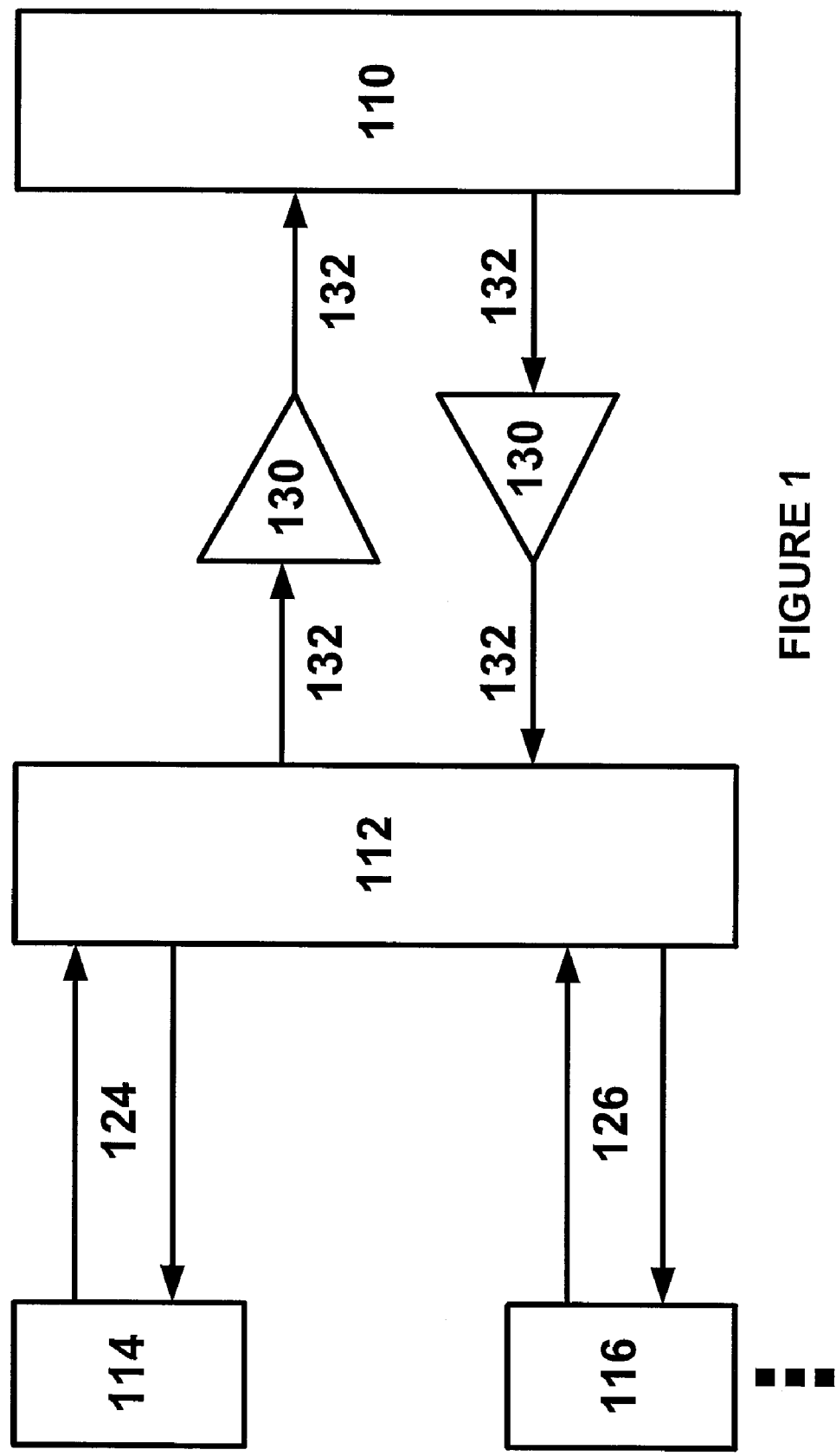
FIG. 1 is a schematic illustration of a scalable multiplexed optical transport system.

In FIG. 1 is shown a block diagram of an optical transport system with a distributed terminal architecture as taught by Jaggi. The distributed terminal architecture of one preferred embodiment comprises master terminal 110, terminal 112 and remote terminals 114 and 116. A specific advantage of the present invention is scalability that allows additional terminals and remote terminals to be added to the architecture. In FIG. 1, master terminal 110 and terminal 112 comprise terminals separated by long haul distances. In a preferred embodiment, a plurality of spans 132 and in-line amplifiers 130 will enable total link distances that are measured in thousands of kilometers. As an example, master terminal 110 may be located in one metropolitan area, while terminal 112 may be located in a second metropolitan area located 6000 km away. Terminal 112 may function as a remote terminal where it is located. In addition to terminal 112, there is also remote terminal 114 and second remote terminal 116 located in the second metropolitan area. In this example, terminal 112, remote terminal 114 and remote terminal 116 comprise distributed terminals in the second metropolitan area. In a preferred embodiment, the fiber link pair 124 between terminal 112 and remote terminal 114 may be a distance of 50 km. In the preferred embodiment, the fiber link pair 126 between terminal 112 and remote terminal 116 may also be 50 km in length. In operation, duplex communication will occur between master terminal 110 and any of terminal 112, remote terminal 114 or remote terminal 116. In a preferred embodiment, one set wavelengths in a spectral band from master terminal 110 terminate in terminal 112, a second set of wavelengths in a spectral band from master terminal 110 terminate in remote terminal 114 and a third set of wavelengths in a spectral band from master terminal 110 terminate in remote terminal 116. In a preferred embodiment, the spectral band is the L-band, which extends from approximately 1565 nm to 1605 nm.

It should be noted that master terminal 110 may also be replaced with a distributed architecture in the first metropolitan area.

FIG. 1 depicts an optical transport system supporting duplex operation wherein each endpoint can both send and receive voice and data traffic. This is important to achieve a typical conversation. In FIG. 1, duplex operation is shown to use two distinct fibers, the both together often referred to as a fiber pair. For example, optical transport systems are sometimes deployed with bidirectional traffic providing duplex service on a single fiber.

Figure 2:
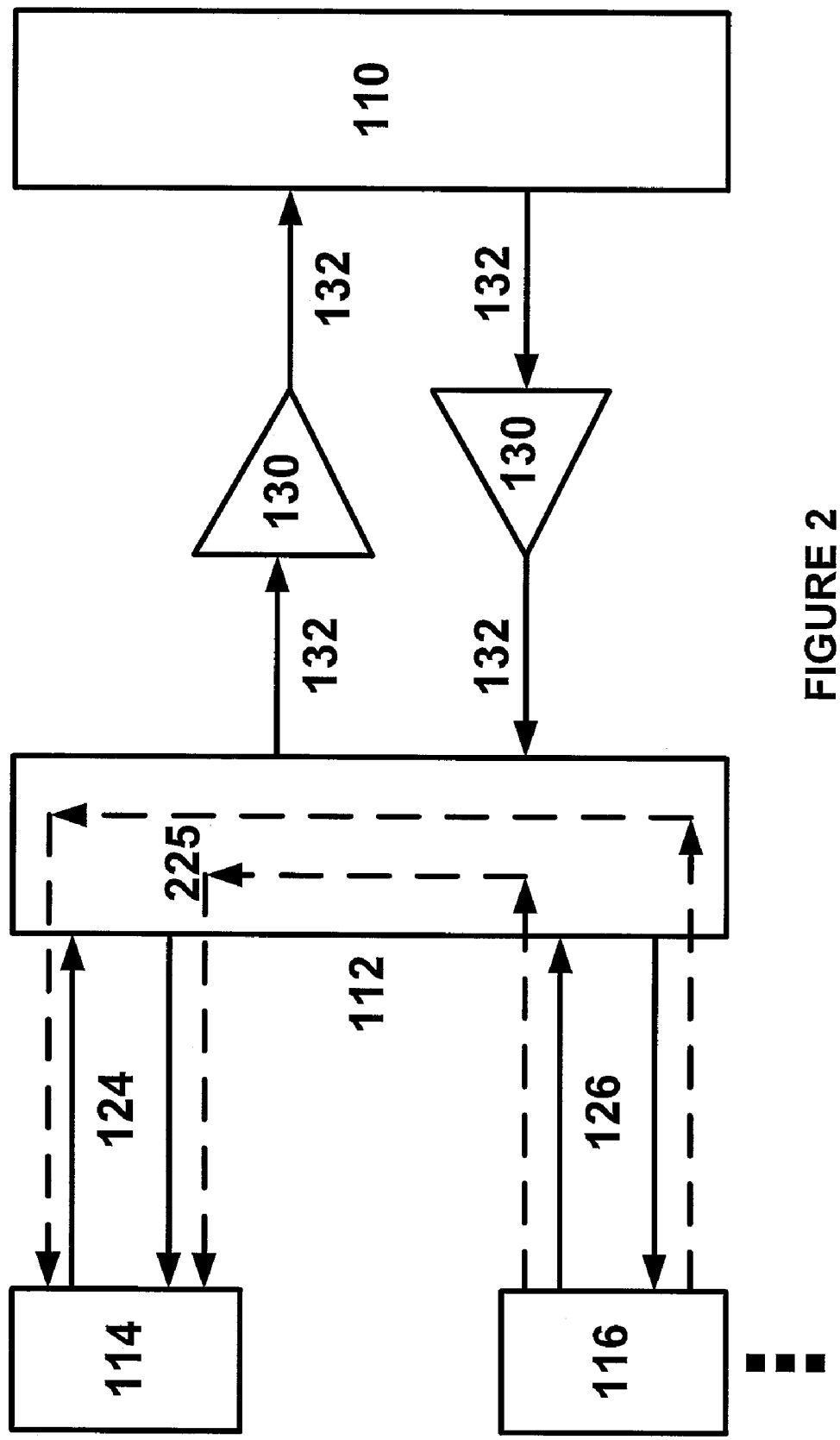
FIG. 2 is a schematic illustration of a scalable multiplexed optical transport system with a distributed terminal architecture having connectivity between remote terminals.

In FIG. 2 is shown a schematic illustration of a multiplexed optical transport system with a distributed terminal architecture having duplex connectivity 225 between terminal 112 and remote terminals 114 and 116. The ellipses below remote terminal 116 indicate that any number of remote terminals can be accommodated. In a preferred embodiment, duplex connectivity 225 is a very high data rate optical link enabled by wavelengths not used in duplex communication with master terminal 110. For example, if duplex communication with master terminal 110 uses optical signals in the L-band, then duplex connectivity between terminal 112 and remote terminal 114 may use signals in the C-band.

Figure 3:
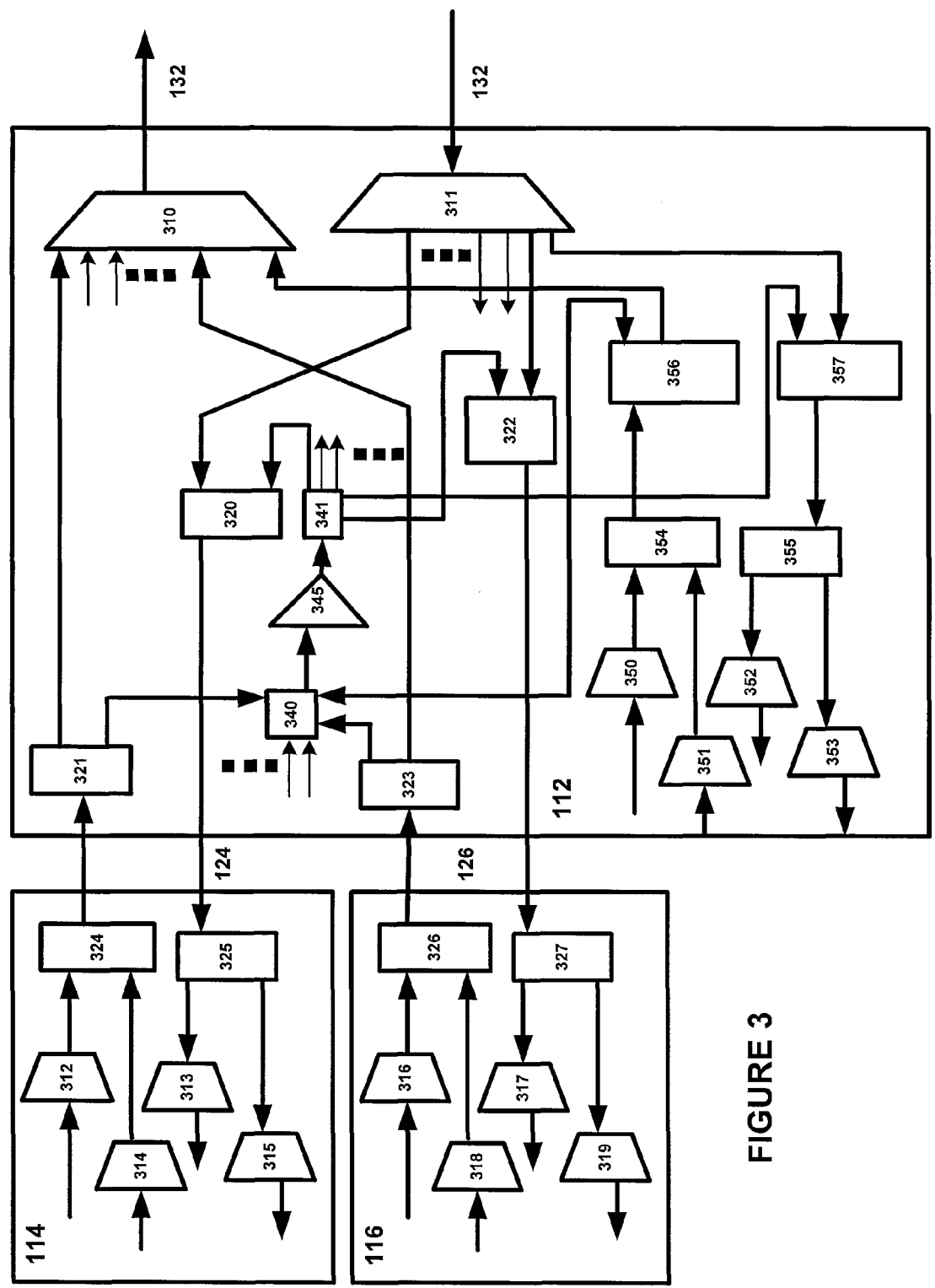
FIG. 3 is a schematic illustration of a scalable optical transport system a distributed terminal architecture having connectivity between remote terminals at a terminal city in accordance with a preferred embodiment.

In FIG. 3 is a block diagram of an optical transport system with a distributed terminal architecture having connectivity between remote terminals at a terminal city in accordance with a preferred embodiment. In particular FIG. 3 shows multiplexing and de-multiplexing arrangements in terminal 112, remote terminal 114 and remote terminal 116 to enable duplex connectivity 225. Shown also is fiber link pair 124 and fiber link pair 126. The arrangement is shown relative to long haul fiber pair 132.

The arrangement comprises multiplexers 310, 312, 314, 316, 318, 350 and 351 as shown in FIG. 3. These multiplexers combine individual wavelengths or channels into bands of wavelengths or channels. Each multiplexer can be a n.times.1 multiplexer to accommodate differing requirements. In addition, the arrangement comprises de-multiplexers 311, 313, 315, 317, 319, 352 and 353. These de-multiplexers subdivide a band of wavelengths, or channels, into particular wavelengths or channels. Examples of multiplexing and de-multiplexing technologies include thin film filters, array waveguides and interleavers, and combinations thereof.

The arrangement further comprises wavelength selective couplers, 320, 322, 324, 326, 354 and 357 and wavelength selective de-couplers 321, 323, 325, 327, 355 and 356. In a preferred embodiment, wavelength selective couplers may be C/L band couplers, which act to couple together C-band signals from one input port and L-band signals from a second input port, and combine them onto a single output port. One technology known in the art for this C/L band coupler is thin film filter technology. In a preferred embodiment, wavelength selective de-couplers may be C/L band de-couplers, which act to de-couple C-band signals and L-band signals from a single input port into C-band signals on a first output port and L-band signals on a second output port. One technology known in the art for this C/L band de-coupler is thin film filter technology. It is noted that a C/L band coupler using thin film filter technology may be used as a C/L band de-coupler by reversing the input and output designations on the ports.

The arrangement further comprises optical coupler 340, and optical de-coupler 341. In a preferred embodiment, optical coupler 340 and optical de-coupler 341 may be splitters and combiners, in particular a 1.times.4 splitter and a 1.times.4 combiner. The ellipsis at 340 and 341 indicate that, in general, optical coupler 340 and optical 341 can be 1.times.n. A 1.times.n coupler allows for the invention to be easily scalable by adding additional signals from other remote terminals cheaply and effectively. In another preferred embodiment, AWG technology may be used to implement optical coupler 340 and optical de-coupler 341. In this manner cyclic routing capability is provided. In particular, 4 port AWGs may be used for optical coupler 340 and optical de-coupler 341. Shown in FIG. 3 is a unidirectional optical amplifier 345 to provide gain to the combined short haul signals. The use of a unidirectional optical amplifier further enhances the scalability of the invention by allowing multiple signals to be amplified without additional equipment or connections. Dispersion compensation may be included as part of the unidirectional optical amplifier to add additional capability as additional remote terminals are added.

In another preferred embodiment wavelength selective de-coupler 321 and wavelength selective coupler 320 may be implemented via a splitter or combiner, in particular, a 1.times.4 splitter/combiner. Similarly, wavelength selective de-coupler 323 and wavelength selective coupler 322 may be implemented via a splitter or combiner, in particular, a 1.times.4 splitter/combiner. In general a 1.times.n splitter or combiner may be used. In this embodiment, optical coupler 340 may be implemented as a spectral band coupler and optical de-coupler 341 may be implemented as a spectral band de-coupler.

The flow of signals through this arrangement may now be understood. Long haul traffic enters and departs the metropolitan area via fiber span 132. Entering traffic is de-multiplexed in de-multiplexer 311. The group of channels to be routed to remote terminal 114 proceeds to wavelength selective coupler 320. At remote terminal 114, the group of channels proceeds through wavelength selective de-coupler 325, and are separated into particular channels via de-multiplexer 313. The group of channels to be routed to remote terminal 116 proceeds from de-multiplexer 311 to wavelength selective coupler 322. At remote terminal 116, the group of channels proceeds through wavelength selective de-coupler 327, and are separated into particular channels via de-multiplexer 317. The group of channels to be routed to terminal 112 proceeds from de-multiplexer 311 to selective coupler 357. The group of channels proceeds then through wavelength selective decoupler 355 and are separated into particular channels via demultiplexer 352.

Duplex communication between remote terminal 114 and master terminal 110 is enabled through a signal flow via multiplexer 312, wavelength selective coupler 324, wavelength selective de-coupler 321, and multiplexer 310. Duplex communication between remote terminal 116 and master terminal 110 is enabled through a signal flow via multiplexer 316, wavelength selective coupler 326, wavelength selective de-coupler 323, and multiplexer 310. Duplex communication between terminal 112 and master terminal 110 is enabled through a signal flow via multiplexer 350, wavelength selective coupler 354, wavelength selective decoupler 356 and multiplexer 310.

Duplex connectivity between remote terminals is now described through this arrangement. Signal flow from remote terminal 114 to remote terminal 116 proceeds via terminal 112 through multiplexer 314, wavelength selective coupler 324, wavelength selective de-coupler 321, into optical coupler 340, through unidirectional optical amplifier 345, and into optical de-coupler 341 and on to wavelength selective coupler 322. The desired path for signals continues through terminal 112 to remote terminal 116, proceeds via wavelength selective coupler 322, wavelength selective de-coupler 327, and through de-multiplexer 319. Depending on the implementation of optical de-coupler 341 there may also be a return path of signals from remote terminal 114, back to remote terminal 114. This return path proceeds via wavelength selective coupler 320, and wavelength selective de-coupler 325. If necessary, these signals are blocked in de-multiplexer 315. Signal flow from remote terminal 116 to remote terminal 114 proceeds through multiplexer 318, wavelength selective coupler 326, wavelength selective de-coupler 323, into optical coupler 340, through unidirectional optical amplifier 345, and into optical de-coupler 341 and on to wavelength selective coupler 320. The desired path for signals to remote terminal 114 then proceeds via wavelength selective coupler 320, wavelength selective de-coupler 325, and through de-multiplexer 315. Depending on the implementation of optical de-coupler 341 there may also be a return path of signals from remote terminal 116, back to remote terminal 116. This return path proceeds via wavelength selective coupler 322, and wavelength selective de-coupler 327. If necessary, these signals are blocked in de-multiplexer 319. Duplex connectivity from terminal 112 to remote terminal 114 and from remote terminal 114 to terminal 112, and from terminal 112 to remote terminal 116 and from remote terminal 116 to terminal 112 is provided in a similar matter. Also, similarly, there may be a return path of signals from terminal 112 back to terminal 112. The invention provides scalability easily with the addition of optical coupler 340, unidirectional amplifier 345 and optical decoupler 341 because additional remote terminals may be added without the need for duplicate amplification.

Additionally, connectivity to other remote terminals can be added in a similar manner. The ellipses near couplers 340 and 341, and de-multiplexer 311 and multiplexer 310, show where additional connections to these terminals may be made.

Figure 4:
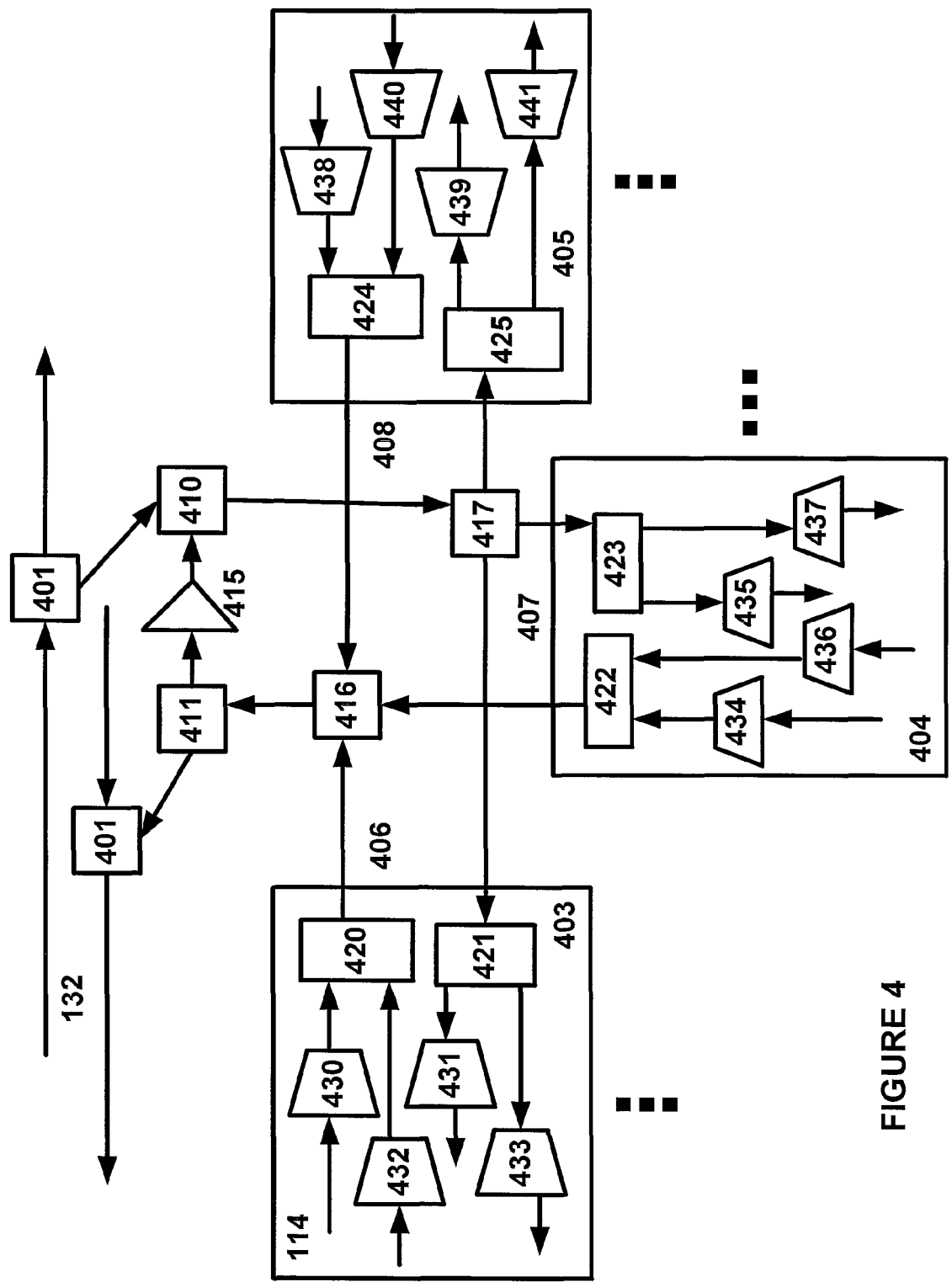
FIG. 4 is a schematic illustration of a scalable optical transport system with a distributed terminal architecture having connectivity among remote terminals at an intermediate optical add-drop multiplexed (OADM) city in accordance with a preferred embodiment.

FIG. 4 is a schematic illustration of an optical transport system with a distributed terminal architecture with connectivity among remote terminals at an intermediate optical add-drop multiplexed (OADM) city in accordance with a preferred embodiment. The arrangement is shown relative to long haul fiber pair 132, and in particular, at an optical add-drop multiplexing (OADM) site which deploys optical coupler 401 and optical de-coupler 402. In a preferred embodiment, optical coupler 401 and optical de-coupler 402 are 50:50 or 3 dB splitters, and the OADM is configured in a broadcast and select mode.

The architecture of the present invention comprises distributed terminals 403, 404 and 405, and enables duplex connectivity among all distributed terminals, or between any two pairs of distributed terminals. Any or all of distributed terminals 403, 404 or 405 may also be remote terminals placed apart from the OADM site, potentially at different locations within a metropolitan area. In a preferred embodiment, short haul fiber pairs 406, 407 and 408 may be approximately 50 km from the OADM site. In will be understood by one skilled in the art, that the distances of short haul fiber pairs 406, 407 and 408 may be unequal, shorter, and, with appropriate optical amplification and dispersion compensation, much longer than 50 km from the OADM site.

The arrangement further comprises wavelength selective coupler 410 and wavelength selective de-coupler 411. In a preferred embodiment, wavelength selective coupler 410 may be C/L band couplers, which act to couple together C-band signals from one input port and L-band signals from a second input port, and combine them onto a single output port. One technology known in the art for this C/L band coupler is thin film filter technology. In a preferred embodiment, wavelength selective de-coupler 411 may be C/L band de-couplers, which act to de-couple C-band signals and L-band signals from a single input port into C-band signals on a first output port and L-band signals on a second output port. One technology known in the art for this C/L band de-coupler is thin film filter technology. It is noted that a C/L band coupler using thin film filter technology may be used as a C/L band de-coupler by reversing the input and output designations on the ports. The arrangement may also comprise optical amplifier 415. As is well known in the art, this optical amplifier may be an erbium doped optical amplifier, or a semiconductor optical amplifier.

The arrangement further comprises optical coupler 416 and optical de-coupler 417. In a preferred embodiment, optical coupler 416 may be a 1.times.N combiner, and optical de-coupler 417 may be a 1.times.N splitter. The ellipses indicate that additional remote terminals may be included in other embodiments.

The arrangement further comprises wavelength selective couplers, 420, 422 and 424, and wavelength selective de-couplers 421, 423, and 425. In a preferred embodiment, wavelength selective couplers may be C/L band couplers, which act to couple together C-band signals from one input port and L-band signals from a second input port, and combine them onto a single output port. One technology known in the art for this C/L band coupler is thin film filter technology. In a preferred embodiment, wavelength selective de-couplers may be C/L band decouplers, which act to de-couple C-band signals and L-band signals from a single input port into C-band signals on a first output port and L-band signals on a second output port. One technology known in the art for this C/L band de-coupler is thin film filter technology. It is noted that a C/L band coupler using thin film filter technology may be used as a C/L band de-coupler by reversing the input and output designations on the ports.

The arrangement comprises multiplexers 430, 432, 434, 436, 438 and 440. These multiplexers combine individual wavelengths or channels into bands of wavelengths or channels. In addition, the arrangement comprises de-multiplexers 431, 433, 435, 437, 439 and 441. These de-multiplexers subdivide a band of wavelengths, or channels, into particular wavelengths or channels. Examples of multiplexing and de-multiplexing technologies include thin-film filters, AWGs and inter-leavers, and combinations thereof.

The flow of signals through this arrangement may now be understood. Long haul traffic enters and departs the OADM via fiber span 132. Entering traffic is split using optical de-coupler 402 and propagates through wavelength selective optical coupler 410. Optical de-coupler 417 broadcasts the entering traffic to remote terminals 403, 404 and 405. At remote terminals 403, 404 and 405, the entering traffic proceeds through wavelength selective de-coupler 421, 423 and 425, and is separated into particular channels via de-multiplexers 431, 435 and 439.

Traffic from distributed terminal 403 intended for transmission on fiber span 132 proceeds from multiplexer 430 to wavelength selective optical coupler 420 and optical coupler 416. The signal proceeds to wavelength selective decoupler 411 to optical coupler 401 onto fiber span 132. Traffic from distributed terminal 404 intended for transmission on fiber span 132 proceeds from multiplexer 434 to wavelength selective optical coupler 422 and optical coupler 416. The signal proceeds to wavelength selective decoupler 411 to optical coupler 401 onto fiber span 132. Traffic from distributed terminal 405 intended for transmission on fiber span 132 proceeds from multiplexer 438 to wavelength selective optical coupler 424 and optical coupler 416. The signal proceeds to wavelength selective decoupler 411 to optical coupler 401 onto fiber span 132.

Connectivity among the distributed terminals is now described through this arrangement. Signals destined for remote terminals 404 and 405 that originates from remote terminal 403 proceeds via multiplexer 432, wavelength selective optical coupler 420, optical coupler 416. From wavelength selective optical coupler 420 until wavelength selective optical de-coupler 411, long haul traffic and short haul traffic propagates together. Wavelength selective optical de-coupler 411 decouples the long haul traffic from the short haul traffic. The short haul signal may proceed through optical amplifier 415, and then into wavelength selective optical coupler 410 and optical de-coupler 417. Optical de-coupler 417 routes the traffic to remote terminals 404 and 405. Depending on the implementation, there may also be a return path to remote terminal 403. Such traffic is blocked or otherwise sorted via de-multiplexer 433. In remote terminal 404, the traffic is routed via wavelength selective optical de-coupler 423 and optical de-multiplexer 437. In remote terminal 405, the traffic is routed via wavelength selective optical de-coupler 425 and optical de-multiplexer 441.

Signals destined for remote terminals 403 and 405 that originate from remote terminal 404 proceed via multiplexer 436, wavelength selective optical coupler 422, optical coupler 416. From wavelength selective optical coupler 422 until wavelength selective optical de-coupler 411, long haul traffic and short haul traffic propagates together. Wavelength selective optical de-coupler 411 decouples the long haul traffic from the short haul traffic. The short haul signal may proceed through optical amplifier 415, and then into wavelength selective optical coupler 410. Optical de-coupler 417 routes the traffic to remote terminals 403 and 405. Depending on the implementation, there may also be a return path to remote terminal 404. Such traffic is blocked or otherwise sorted via de-multiplexer 437. In remote terminal 403, the traffic is routed via wavelength selective optical de-coupler 421 and optical de-multiplexer 433. In remote terminal 405, the traffic is routed via wavelength selective optical de-coupler 425 and optical de-multiplexer 441.

Signals destined for distributed terminals 403 and 404 that originate from remote terminal 405 proceed via multiplexer 440, wavelength selective optical coupler 424, optical coupler 416. From wavelength selective optical coupler 424 until wavelength selective optical de-coupler 411, long haul traffic and short haul traffic propagates together. Wavelength selective optical de-coupler 411 decouples the long haul traffic from the short haul traffic. The short haul signal may proceed through optical amplifier 415, and then into wavelength selective optical coupler 410. Optical de-coupler 417 routes the traffic to remote terminals 403 and 404. Depending on the implementation, there may also be a return path to remote terminal 405. Such traffic is blocked or otherwise sorted via de-multiplexer 441. In remote terminal 403, the traffic is routed via wavelength selective optical de-coupler 421 and optical de-multiplexer 433. In remote terminal 404, the traffic is routed via wavelength selective optical de-coupler 423 and optical de-multiplexer 437.

Additional distributed terminals may be connected and traffic between terminals will flow in a similar manner to the above descriptions for terminals 403, 404 and 405. The ellipses in FIG. 4 indicate additional distributed terminals and additional ports of coupler 416 and decoupler 417.

Figure 5:
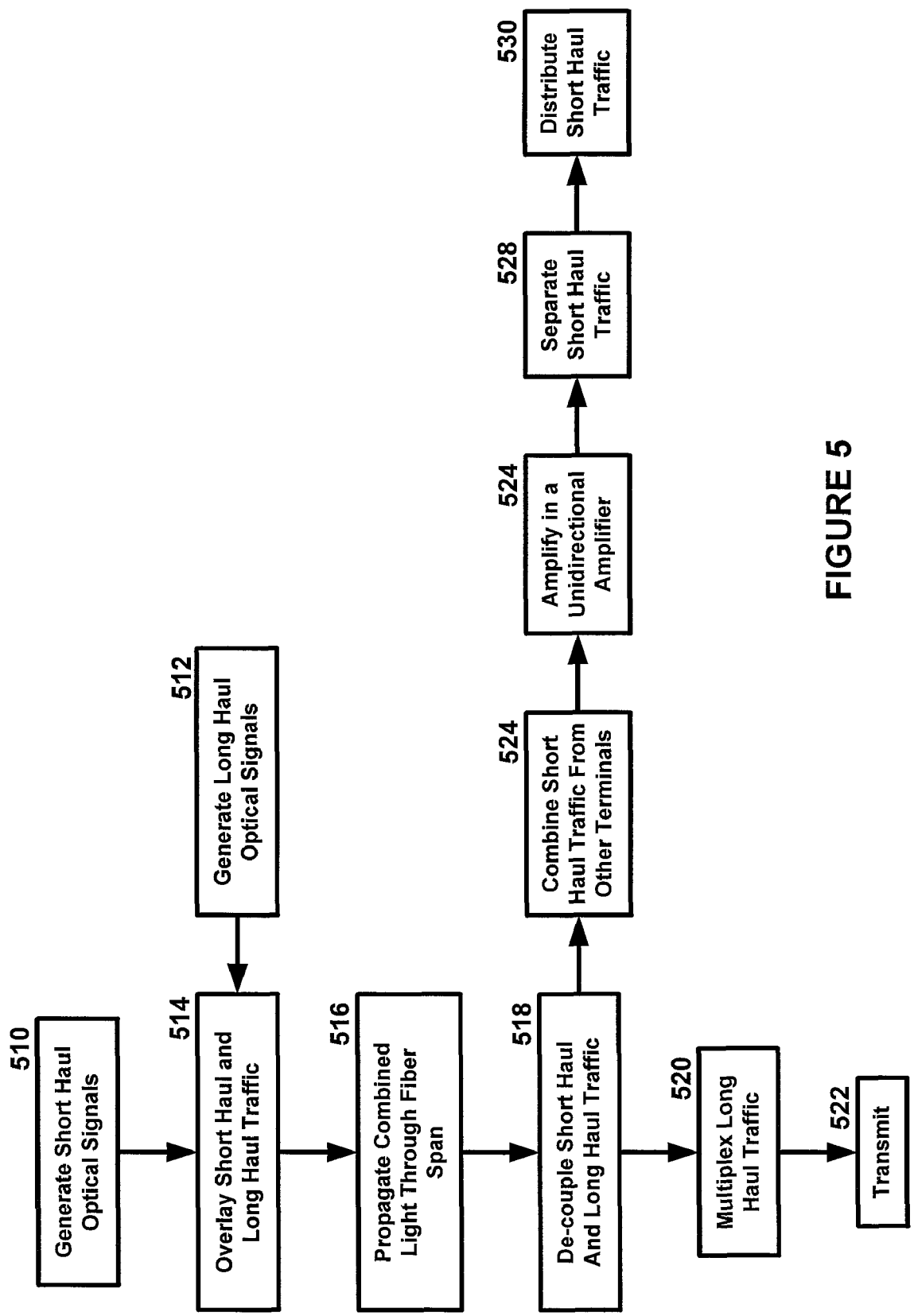
FIG. 5 is a flow chart of the method of combining short haul traffic with long haul traffic in accordance with this invention.

In FIG. 5 is shown a flow chart of the method of combining short haul traffic with long haul traffic in order to provide connectivity between distributed terminals which is a subject of this invention. In step 510, short haul traffic is generated on a first spectral band. In a preferred embodiment, this first spectral band is the C-band. In step 512, long haul traffic is generated on a second spectral band. In a preferred embodiment, this first spectral band is the L-band. In step 514, the first spectral band and second spectral band are over-layed. In a preferred embodiment this step is accomplished using a wavelength selective optical coupler. A wavelength selective optical coupler may be a C/L band coupler. A thin film filter may be used to realize a C/L band coupler. In step 516 the combined traffic is propagated along a metropolitan fiber span. In step 518, the short haul traffic is separated from the long haul traffic. In a preferred embodiment this step is accomplished using a wavelength selective optical de-coupler. A wavelength selective optical de-coupler may be a C/L band de-coupler. A thin film filter may be used to realize a C/L band de-coupler. At step 518, the short haul and long haul traffic is also split into two directions. Long haul traffic is multiplexed at step 520, followed by transmission on long haul optical fiber 522. Short haul traffic is combined with other short haul traffic from other terminals in step 524. It is amplified in unidirectional amplifier at 526 and then is separated into specific short haul traffic at step 528. When separated, the short haul traffic is distributed at step 530. In a preferred embodiment, this method provides half-duplex connectivity between two distributed terminals, and may be repeated in the opposite traffic flow direction to achieve duplex connectivity between the two distributed terminals.

In an alternate embodiment, this method may be used to provide connectivity between a distributed terminal and a central location such as a master terminal or an OADM site. Additional routing from the central location is employed to further propagate the short haul traffic to a second distributed terminal. In a preferred embodiment, this additional routing may be achieved using an optical de-coupler. An optical splitter may be used to realize the optical de-coupler. In a preferred embodiment, this method provides half-duplex connectivity between two distributed terminals, and may be repeated in the opposite traffic flow direction to achieve duplex connectivity between the two distributed terminals.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed:

1. A method for communicating optical signals, the method comprising:

receiving, at a terminal from a first remote terminal, a first overlay signal, the first overlay signal comprising a first short haul signal and a first long haul signal;

receiving, at the terminal from a second remote terminal, a second overlay signal, the second overlay signal comprising a second short haul signal and a second long haul signal;

receiving, at the terminal from a master terminal, a third long haul signal and a fourth long haul signal;

decoupling, at the terminal, the first short haul signal and the first long haul signal from the first overlay signal;

decoupling, at the terminal, the second short haul signal and the second long haul signal from the second overlay signal;

coupling, at the terminal, the second short haul signal and the third long haul signal to form a third overlay signal;

coupling, at the terminal, the first short haul signal and the fourth long haul signal to form a fourth overlay signal;

transmitting the third overlay signal from the terminal to the first remote terminal;

transmitting the fourth overlay signal from the terminal to the second remote terminal; and transmitting the first long haul signal and the second long haul signal from the terminal to the master terminal.

2. The method of claim 1, wherein the first and second remote terminals are each located in the same metropolitan area.

3. The method of claim 1, wherein:

decoupling the first short haul signal and the first long haul signal from the first overlay signal comprises decoupling in a C/L band; and coupling the first short haul signal and the fourth long haul signal to form the fourth overlay signal comprises coupling in a C/L band.

4. The method of claim 1, wherein:

decoupling the second short haul signal and the second long haul signal from the second overlay signal comprises decoupling in a C/L band; and coupling the second short haul signal and the third long haul signal to form the third overlay signal comprises coupling in a C/L band.

5. The method of claim 1, wherein the first and third long haul signals each include a respective L band signal, and wherein the first short haul signal includes a C band signal.

6. The method of claim 1, further comprising:

multiplexing the first long haul signal and the second long haul signal prior to transmitting the first and second long haul signals to the master terminal; and demultiplexing the third long haul signal and fourth long haul signal prior to coupling the third long haul signal with the second short haul signal and prior to coupling the fourth long haul signal with the first short haul signal.

7. The method of claim 1, wherein the first short haul signal is a data signal.

8. The method of claim 1, wherein the first remote terminal is located remotely from the second remote terminal.

9. A terminal for communicating optical signals, comprising:

a first decoupler configured to decouple a first short haul signal and a first long haul signal from a first overlay signal, wherein the terminal is configured to receive the first overlay signal from a first remote terminal;

a second decoupler configured to decouple a second short haul signal and a second long haul signal from a second overlay signal, wherein the terminal is configured to receive the second overlay signal from a second remote terminal;

a first coupler configured to couple the second short haul signal and a third long haul signal to form a third overlay signal, wherein the terminal is configured to receive the third long haul signal from a master terminal; and a second coupler configured to couple the first short haul signal and a fourth long haul signal to form a fourth overlay signal, wherein the terminal is configured to receive the fourth long haul signal from the master terminal;

wherein the terminal is further configured to:
transmit the third overlay signal to the first remote terminal,
transmit the fourth overlay signal to the second remote terminal, and
transmit the first long haul signal and the second long haul signal to the master terminal.

10. The terminal of claim 9, wherein the first and second remote terminals are each located in the same metropolitan area.

11. The terminal of claim 10, wherein the terminal is located in the same metropolitan area as the first and second remote terminals.

12. The terminal of claim 9, wherein the first decoupler comprises a C/L band decoupler and the second coupler comprises a C/L band coupler.

13. The terminal of claim 12, wherein the second decoupler comprises a C/L band decoupler and the first coupler comprises a C/L band coupler.

14. The terminal of claim 9, wherein the first and third long haul signals each include a respective L band signal, and wherein the first short haul signal includes a C band signal.

15. The terminal of claim 9, further comprising:
a multiplexer configured to multiplex the first long haul signal and the second long haul signal prior to transmitting the first and second long haul signals to the master terminal; and
a demultiplexer configured to demultiplex the third and fourth long haul signals prior to coupling the fourth long haul signal with the first short haul signal and prior to coupling the third long haul signal with the second short haul signal.

16. The terminal of claim 9, wherein the first short haul signal is a data signal.

17. The terminal of claim 9, wherein the first remote terminal is located remotely from the second remote terminal.

18. A system for communicating optical signals, comprising:
means for receiving, at a terminal from a first remote terminal, a first overlay signal comprising a first short haul signal and a first long haul signal;
means for receiving, at the terminal from a second remote terminal, a second overlay signal, the second overlay signal comprising a second short haul signal and a second long haul signal;
means for receiving, at the terminal from a master terminal, a third long haul signal and a fourth long haul signal;
means for decoupling, at the terminal, the first short haul signal and the first long haul signal from the first overlay signal;
means for decoupling, at the terminal, the second short haul signal and the second long haul signal from the second overlay signal;
means for coupling, at the terminal, the second short haul signal and the third long haul signal to form a third overlay signal;
means for coupling, at the terminal, the first short haul signal and the fourth long haul signal to form a fourth overlay signal;
means for transmitting the third overlay signal from the terminal to the first remote terminal;
means for transmitting the fourth overlay signal from the terminal to the second remote terminal; and
means for transmitting the first long haul signal and the second long haul signal from the terminal to the master terminal.

19. The system of claim 18, wherein the first and second remote terminals are each located in the same metropolitan area.

20. The system of claim 19, wherein the system is located in the same metropolitan area.

21. The system of claim 18, wherein the means for decoupling the first short haul signal and the first long haul signal from the first overlay signal comprises means for decoupling in a C/L band and the means for coupling the first short haul signal and the fourth long haul signal to form the fourth overlay signal comprises means for coupling in a C/L band.

22. The system of claim 21, wherein the means for decoupling the second short haul signal and the second long haul signal from the second overlay signal comprises means for decoupling in a C/L band and the means for coupling the second short haul signal and the third long haul signal to form the third overlay signal comprises means for coupling in a C/L band.

23. The system of claim 18, wherein the first and third long haul signals each include a respective L band signal, and wherein the first short haul signal includes a C band signal.

24. The system of claim 18, further comprising:
means for multiplexing the first long haul signal and the second long haul signal prior to transmitting the first and second long haul signals to the master terminal; and
means for demultiplexing the third long haul signal and the fourth long haul signal prior to coupling the third long haul signal with the second short haul signal and prior to coupling the fourth long haul signal with the first short haul signal.

25. The system of claim 18, wherein the first short haul signal is a data signal.

26. The system of claim 18, wherein the first remote terminal is located remotely from the second remote terminal.

* * * * *

UNITED STATES PATENT AND TRADEMARK OFFICE
CERTIFICATE OF CORRECTION

PATENT NO.         : 8,195,048 B2                                   Page 1 of 1
APPLICATION NO.    : 12/540913
DATED              : June 5, 2012
INVENTOR(S)        : Chiu et al.

It is certified that error appears in the above-identified patent and that said Letters Patent is hereby corrected as shown below:

ON THE TITLE PAGE:

On Page 2, in Item (56) References Cited, under "OTHER PUBLICATIONS", in Column 2, Line 1, delete "Multiwavelenght" and insert -- Multiwavelength --, therefor.

IN THE DRAWINGS:

In Fig. 5, Sheet 5 of 5, delete " 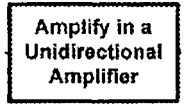 " and insert -- 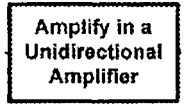 --, therefor.

IN THE SPECIFICATIONS:

In Column 5, Line 14, delete "optical 341" and insert -- optical de-coupler 341 --, therefor.

Signed and Sealed this
Ninth Day of April, 2013

Teresa Stanek Rea
*Acting Director of the United States Patent and Trademark Office*